United States Patent [19]

Scholz

[11] Patent Number: 4,855,372

[45] Date of Patent: Aug. 8, 1989

[54] METHOD OF PREPARING PULVERULENT OLEFIN-MALEIC ANHYDRIDE COPOLYMERS

[75] Inventor: Bernhard-Peter Scholz, Oer-Erkenschwick, Fed. Rep. of Germany

[73] Assignee: Hüls Aktiengesellschaft, Marl, Fed. Rep. of Germany

[21] Appl. No.: 54,824

[22] Filed: May 27, 1987

[30] Foreign Application Priority Data

Aug. 20, 1986 [DE] Fed. Rep. of Germany ....... 3628247

[51] Int. Cl.$^4$ ............................................... C08F 2/08
[52] U.S. Cl. ..................................... 526/201; 526/272
[58] Field of Search ................................ 526/272, 201

[56] References Cited

U.S. PATENT DOCUMENTS

| | | | |
|---|---|---|---|
| Re. 28,475 | 7/1975 | Blecke et al. | 526/272 |
| 4,048,422 | 9/1977 | Sackmann et al. | 526/272 |

*Primary Examiner*—C. Warren Ivy
*Assistant Examiner*—Alex H. Walker
*Attorney, Agent, or Firm*—Oblon, Fisher, Spivak, McClelland & Maier

[57] ABSTRACT

A method for preparing pulverulent olefin-maleic anhydride copolymers from concentrated solutions of olefins and maleic anhydride in organic solvents, by radical polymerization in the presence of dispersants.

16 Claims, No Drawings

METHOD OF PREPARING PULVERULENT OLEFIN-MALEIC ANHYDRIDE COPOLYMERS

BACKGROUND OF THE INVENTION

1. Field of the Invention

The invention relates to pulverulent olefin-maleic anhydride polymers which are produced from concentrated solutiosn of olefins and maleic anhydride in organic solvents, by radical polymerizaton.

2. Discussion of the Background

Olefins such as ethylene, propene, 1-butene, or isobutene can be copolymerized with maleic anhydride. This gives rise to copolymers with equimolar proportions of olefin and maleic anhyride.

When the polymerization is carried out in organic solvents, at temperatures above 100° C., soft, adhesive products are produced which tend to clump together and stick to stirrers and reactor walls. High temperatures tend to promote formation of low molecular weight polymers, however. Such polymers may be used, for example, as dispersants.

At temperatures below 100° C., pulverulent olefin-maleic anhydride copolymers can be prepared. However, a disadvantage is that at low temperatures very long reaction times are required for maleic anhydride conversions greater than 90%.

In known methods, an effort is made to reduce the molecular weight by adding various additives at low temperatures. These additives are, for example, carboxylic acids (British Patent No. 851,237), phosphites (U.S. Pat. No. 2,857,365), and aldehydes (U.S. Pat. No. 2,938,016). As a result, low molecular weight olefin-maleic anhydride copolymers are precipitated from organic solutions at 40°-80° C., and can be separated out. The reaction times are generally about 20 hr.

In all experiments, solids contents of not more than 20% are obtained at the conclusion of the polymerization.

According to Japanese Patent No. 54,156,092, olefins with preferably 4-6 carbon atoms can be copolymerized with maleic anhydride. Ethylene-vinyl acetate copolymer is added to diminish or eliminate adhesion of the polymer product to the reaction vessel. The polymerization is carried out in aliphatic hydrocarbons at 75° C., in about 3 hr. Maleic anhydride conversions of 70-80% and solids contents of <20% are obtained.

Industrially important maleic anhydride conversions are in the range >90%, and industrially important solids contents are in the range >20%. These are not described in Japanese Pat. No. 54-156,092.

SUMMARY OF THE INVENTION

Accordingly, the object of the present invention is to provide a method by which pulverulent olefin-maleic anhydride copolymers can be prepared from concentrated solutions of olefin and maleic anhydride, at reduced reaction times and with high maleic anhydride conversion.

This and other objects which will become apparent from the following specification have been achieved by the present method of preparing a pulverulent olefin-maleic anhydride copolymer from a solution of an olefin, maleic anhydride and an organic solvent, comprising the steps of:

(i) radically polymerizing the olefin and maleic anhydride at a temperature of about 80°-160° C. in the presence of a dispersant to produce a solids containing reaction mixture;

(ii) terminating the polymerizing step when the maleic anhydride conversion is greater than 90%; and (iii) separating the copolymer from the reaction mixture.

DETAILED DESCRIPTION OF THE PREFERRED EMBODIMENTS

The process of the present invention is that of a radical polymerization of olefins which maleic anhydride at temperatures of about 80°-160° C. in aromatic solvents in the presence of dispersants, wherein the final overall conversion of maleic anhydride in the polymerization step is greater than 90%. The copolymer is subsequently separated out as a powder.

Preferred olefins are 1-olefins such as ethylene, propene, 1-butene, and isobutene. The most preferred olefin is ethylene.

Preferred aromatic solvents are benzene, xylene, cumene, tert-butylbenzene, other $C_{1-20}$ alkylbenzenes and mixtures of these. The most preferred solvent is toluene.

The reaction temperature is preferably in the range of 80°-160° C. with 90°-150° C. being preferred.

Preferably the polymerization is terminated when a maleic anhydride conversion of greater than 90% and more preferably 95% is achieved.

Although it is possible to carry out the polymerization in dilute solutions, small amounts of solvents are used, i.e., more concentrated solutions are used, in order to increase the yield per unit space per unit time for a given reactor size. Generally, the olefins and maleic anhydride are used in concentrations such that at the conclusion of the polymerization a solids content of 20-70% is attained. Preferably the solids content is 30-60%.

Suitable dispersants are polystyrene and ethylene-vinyl acetate copolymer or mixtures of these. These dispersants may have a molecular weight of 5,000 ot 250,000; preferred as dispersants with a molecular weight of 100,000 to 250,000.

The amount of dispersant used is 0.01-5 wt.% based on the weight of the monomer mixture. The preferred amounts are 0.05-3 wt.% for the polystyrene dispersant or 0.03-1wt. % for the ethylene-vinyl acetate copolymer dispersant. The dispersant may be added at the beginning of the polymerization or may be added in portions during the polymerization.

The usual peroxides or azo compounds are suitable as initiators for the polymerization. Examples are dibenzoyl peroxide, lauryl peroxide, cumene hydroperoxide, and azoisobutyronitrile. Dibenzoyl peroxide is preferably used. The amount of initiator used is 0.1-5 mol % based on them aleic anhydride employed. The entire amount of initiator may be added at the start, or preferably, initiator may be added in portions during the polymerization.

The olefin-maleic anhydride copolymer produced according to the inventive method precipitates out as a powder. It may be separated from the reaction mixture by decanting, centrifugin, or filtering. In some instances the products are first put into stable dispersion in the solvent, so that a powder sediments out only after cooling to room temperature. This powder can then be filtered out. It is also possible to obtain very fine particles which remain in a stable dispersion for several days in the reaction mixture after cooling to room temperature. The powder can be separated out of such dispersion by centrifuging, or by filtration after addition of an aliphatic hydrocarbon.

The powders prepared are compact and are distinguished by high bulk density. These powders are particularly suitable for polymer analog reactions, since in suspensions the viscosities are relatively low despite high powder concentrations. Thus, 50% suspensions in toluene are still quite stirrable.

In polymer analog reactions, the anhydridce groups in the olefin-maleic anhydride copolymer can be, for example, partially or completely saponified, esterified, or amidated, with alkalis, alcohols, or amines, respectively.

According to the inventive method, colorless pulverulent olefin-maleic anhydride copolymers with preferably low molecular weights of 1,000 to 30,000 are produced. However, higher molecular weights can be produced despite the high reaction temperatures.

At overall reaction times of only about 10 hr and highly concentrated solutions, the yields per unit space per unit time are very high, the maleic anhydride conversions are >90%.

Additionally, the concentrations of auxiliary agents are low.

In general, olefin-maleic anhydride copolymers with equimolar proportions of olefin and maleic anhydride are obtained. However, the ratio of olefin to maleic anhydride can be varied to produce polymers with non-equimolar proportions of olefin and maleic anhydride.

The range of applications of the olefin-maleic anhydride copolymers prepared according to the inventive method is broad. Copolymers with low molecular weights can be used, for example, as dispersants for pigments. The specific properties of the copolymer can be easily talored to the application by subsequent reaction of the anhydride group.

Other features of the invention will become apparent in the course of the following descriptions of exemplary embodiments which are given for illustration of the invention and are not intended to be limiting thereof.

EXAMPLES

Examples 1 to 5 and Comparison Examples A and B

Toluene or cumene, maleic anhydride, and (except for Example 4) anhydrous dibenzoyl peroxide (BPO) were charged into a 12-liter $V_4A$ reactor with an impeller-type stirrer (250 rpm) and a probe for measuring the ethylene consumption. In Example 4 the BPO, dissolved in 1 liter toluene, was added portion-wise over 3 hr. In Examples 1–5 the mixture initially charged to the reactor also contained a dispersant.

The mixtures were heated to 90° C., and ethylene at a pressure of 15 bar was applied.

The amounts of the components and the analytical data are given in Table 1.

TABLE 1

| Example No. | 1 | A | 2 | 3 | 4 | B | 5 |
|---|---|---|---|---|---|---|---|
| Toluene, total, (ml) | 6,000 | 6,000 | 6,000 | 6,000 | 6,000 | 6,000 | 6,000 (Cumene, ml) |
| Maleic anhydride, g | 1,000 | 1,000 | 1,000 | 2,000 | 2,000 | 2,000 | 1,000 |
| Dispersant (g) | 10 EVA[1] | 0 | 10 PS[2] | 20 PS[2] | 20 EVA[1] | 0 | 10 EVA[1] |
| BPO (g) | 36.1 | 36.1 | 36.1 | 72.1 | 72.1 | 72.1 | 72.1 |
| Yield, g | 1,201 | 607 | 1,101 | 2,400 | 2,516 | 0 | 1,219 |
| Residues adhering to vessel, g | 0 | 430 | 0 | 0 | 0 | 100%[3] | 0 |
| Eta red.[4] | 0.122 | 0.078 | 0.089 | 0.107 | 0.130 | — | 0.075 |
| Reaction time, hr.[5] | 6 | 10 | 8 | 7 | 7 | — | 6 |
| Monomeric Maleic anhydride[6] | 0.9% | 3.6% | 2.5% | 1.1% | 1.4% | — | 0.7% |
| Solids content[7] | 20 | 20 | 20 | 33 | 33 | 33 | 20 |

[1] Ethylene-vinyl acetate copolymer (Levapren ® 500, supplied by Bayer AG, of D-5090 Leverkusen)
[2] Polystyrene, with $M_W = 150,000$
[3] No product - only residues adhering to vessel and large-crystalline material, therefore the experiment had to be terminated.
[4] 1% solution in DMF at 25%.
[5] Reaction time in hr, to point of zero uptake rate of ethylene
[6] Monomeric maleic anhydride, determined by polarography at end point.
[7] Solids content (%), at end point of polymerization Table 1 shows the following:

(1) In Examples 1–5, the ethylene uptake was completed after 6–8 hr. The product precipitated out as a fine, colorless powder.

(2) In the absence of a dispersant, and with 20% solids content of the reaction mixture at the end of the polymerization (Comparison Example A), the amount of residues adhering to the vessel was >405%. The reaction time was longer, and the residual maleic anhydride content was higher than in the presence of a dispersant.

(3) In the absence of a dispersant, and with 335 solids content of the reaction mixture at the end of the polymerization (Comparison Example B), the experiment had to be terminated prematurely, because the entire polymer mass separated out as a residue adhering to the vessel.

Examples 6 to 11

The method of Example 1 was used except that higher temperatures were used for the polymerization. The BPO was added portion-wise in every case.

The amounts of materials used and the results are given in Table 2.

TABLE 2

| Example No. | Temp. | Components in Reactor at Start of Reaction | | | Components added Gradually Over the Dosing Time | | | DT[1] (hr) | Maximum[2] React. Rate (hr) | $M_n$[3] | $M_w$[3] | Monomeric Maleic Anhydride (%) | Solids[4] (%) | D %[5] |
|---|---|---|---|---|---|---|---|---|---|---|---|---|---|---|
| | | Toluene (ml) | Maleic Anhydride (g) | Polystyrene (g) | Dibenzoyl Peroxide (g) | Polystyrene (g) | Toluene (ml) | | | | | | | |
| 6 | 120 | 3,500 | 3,000 | 10 | 107 | 10 | 1,500 | 6 | 3.0 | 2,900 | 7,600 | 1.5 | 48 | 0.45 |
| 7 | 120 | 3,500 | 3,000 | 20 | 107 | 0 | 1,500 | 6 | 1.5 | 3,100 | 9,000 | 0.9 | 48 | 0.45 |
| 8 | 120 | 3,500 | 3,000 | 0 | 107 | 20 | 1,500 | 6 | 3.0 | 2,600 | 6,900 | 6.0 | 48 | 0.45 |
| 9 | 130 | 3,500 | 3,000 | 6 | 107 | 6 | 1,500 | 4 | 1.5 | 2,600 | 7,500 | 2.0 | 48 | 0.27 |
| 10 | 140 | 3,500 | 3,000 | 10 | 107 | 10 | 1,500 | 4 | 1.5 | 2,300 | 5,600 | 1.2 | 48 | 0.45 |
| 11 | 120 | 3,500 | 3,000 | 10[6] | 107 | 10[6] | 1,500 | 4 | 2.0 | 2,200 | 8,800 | 1.0 | 48 | 0.45 |

[1]Dosing or addition time, hr.
[2]Maximum reaction rate (hr) determined from ethylene uptake and elapsed time.
[3]Determined by gel chromatography.
[4]Solids content at end of polymerization, %.
[5]Dispersant, %.
[6]10 g ethylene-vinyl acetate copolymer added instead of polystyrene.

Results of Examples 6-11

(1) The reaction time (which was the addition time plus 2 hr subsequent stirring) was 6-8 hr.

(2) When the entire amount of the dispersant was added at the start of the reaction (Example 7), the reaction rate and molecular weight were the highest.

(3) In Examples 6-10, stable dispersions were obtained which broke up only at room temperature. In Example 11, the dispersion produced was stable for several days at room temperature.

Examples 12 to 15

The method of Example 1 was used except that the ethylene pressure was varied. The polymerization temperature was 90° C.

The amounts of materials used and the results are given in Table 3.

TABLE 3

| Example No. | Pressure (bar) | Components in Reactor at Start of Reaction | | | Components Added Gradually Over the Dosing Time | | Polymer Characteristics | | |
|---|---|---|---|---|---|---|---|---|---|
| | | Toluene (ml) | Maleic Anhydride (MA) g | EVA[1] (g) | Dibenzoyl Peroxide (g) | Toluene (ml) | Eta Red[2] | Mole Ratio MA:Ethylene[3] | Unconverted MA[4] % |
| 12 | 15 | 4,000 | 2,000 | 20 | 72.1 | 1,000 | 0.130 | 1.00:1 | 1.4 |
| 13 | 8 | 4,000 | 2,000 | 20 | 96.1 | 2,000 | 0.081 | 1.11:1 | 2.8 |
| 14 | 5 | 4,000 | 2,000 | 20 | 96.1 | 2,000 | 0.067 | 1.17:1 | 3.5 |
| 15 | 3 | 4,000 | 2,000 | 20 | 96.1 | 2,000 | 0.050 | 1.26:1 | 3.6 |

[1] Ethylene-vinyl acetate copolymer, g.
[2] 1% solution in DMF at 25° C.
[3] Mole ratio of maleic anhydride (MA) to ethylene, calculated from elemental analysis.
[4] Uncoverted maleic anhydride (MA) determined polarographically.

Table 3 indicates that the rate of uptake of the ethylene decreases with decreasing pressure. At the same time, the solution viscosities of the ethylene-maleic anhydride copolymers and thus their molecular weights are decreased.

Example 16

1 kg ethylene-maleic anhydride copolymer powder, prepared according to Example 6, was suspended in or worked into a paste with 1 kg toluene, and heated to 90° C. 2,560 g of 25% aqueous sodium hydroxide was added portion-wise over 30 min., and the mixture was then stirred an additional 30 min at 90° C. The reaction mixture was stirrable during the entire time.

The phases were separated. The aqueous phase contained the sodium salt of the ethylene-maleic anhydride copolymer and the ethylene-maleic anhydride copolymer was precipitated out by acidification.

Comparison Example C 1 kg toluene was added to 1 kg ethylene-maleic anhydride copolymer powder with $M_n = 3,000$. The powder was polymerized without a dispersant (contrast with Example 16), and polymerization was carried out at 75° C. The porous powder completely absorbed the toluene. A stirrable suspension was produced only after adding an additional 1 kg toluene.

During the addition of the 2,560 g of 25% aqueous sodium hydroxide, a highly viscous, pudding-like mass was produced, which was no longer stirrable.

After cooling, phase separation occured only after 16 hr. The aqueous phase contained the sodium salt of the ethylene-maleic anhydride copolymer.

Example 17

200 g (1.58 mol) ethylene-maleic anhydride copolymer according to Example 6 was reacted with 121 g (1.05 mol) of 2-ethyl-1-hexanol for 3 hr at 170° C. The product mixture was a light yellow, stirrable liquid. This was cooled to 100° C., and the product, a viscous oil, was poured onto a plate.

The product was a polymeric partial ester, Partial Ester 1, with 34 mole% anhydride groups and 66 mole% half-ester groups.

100 g Partial Ester 1 was dissolved in 100 ml acetone and added dropwise to a mixture of 450 ml acetone, 200 ml methanol, and 30 g NaOH. The precipitate was filtered out.

The products was 105 g of the sodium salt of the polymeric partial ester, Partial Ester II, having carboxyl groups, 2-ethylhexyl ester groups, and methyl ester grups. The products was water soluble.

Comparison Example D

Example 17 was repeated, but an ethylene-maleic anhydride copolymer according to Comparison Example C was used instead of the copolymer according to Example 6. The reaction mass obtained after addition of the 121 g of 2-ethyl-1-hexanol was not stirrable; accordingly, the experiment was terminated.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of preparing a pulverulent olefin-maleic anhydride copolymer from a solution of an olefin, maleic anhydride and an organic solvent, said solvent being capable of dissolving said olefin and said maleic anhydride, and said solvent being selected from the group consisting of benzene, $C_{1-20}$-alkylbenzenes and mixtures thereof, comprising the steps of:
   (i) radically polymerizing said olefin and maleic anhydride in said solution at a temperature of about 80°-160° C. in the presence of a dispersant, to produce a solids containing reaction mixture;
   (ii) terminating said polymerizing step when the maleic anhydride conversion is greater than about 90%; and
   (iii) separating said copolymer from said reaction mixture.

2. The method of claim 1, wherein said polymerizing step is conducted at a temperature from about 90°-150° C.

3. The method of claim 2, wherein said terminating step is performed when the maleic anhydride conversion is greater than about 95%.

4. The method of claim 1, wherein said solids containing reaction mixture has s olids content of 2070%.

5. The method of claim 4, wherein said solids content is about 30-60%.

6. The method of claim 1, wherein said organic solvent is selected from the groups consisting of toluene, xylene, cumene, and tert-butyl benzene.

7. The method of claim 6, wherein said solvent is toluene.

8. The method of claim 1, wherein said olefin is a 1-olefin.

9. The method of claim 8, wherein said olefin is a $C_{2-4}$ 1-olefin.

10. The method of claim 8, wherein said olefin is ethylene.

11. The method of claim 1, wherein said dispersant is present in an amount of about 0.01-5 wt.% based on the weight of the monomer mixture.

12. The method of claim 11, wherein said dispersant is polystyrene.

13. The method of claim 12, wherein said polystyrene is present in an amount of about 0.05-3 wt.% based on the weight of the monomer mixture.

14. The method of claim 11, wherein said dispersat is an ethylene-vinyl acetate copolymer.

15. The method of claim 14, wherein said ethylene-vinyl acetate copolymer is present in an amount of about 0.03-1 wt.% based on the weight of the monomer mixture.

16. An olefin-maleic anhydride copolymer prepared by the method of claim 1.

* * * * *

UNITED STATES PATENT AND TRADEMARK OFFICE
CERTIFICATE OF CORRECTION

PATENT NO. : 4,855,372
DATED : August 8, 1989
INVENTOR(S) : Bernhard-Peter Scholz It is certified that error appears in the above-identified patent and that said Letters Patent is hereby corrected as shown below:

In Claim 4, line 2, delete "s olids" and insert --a solids--.

In Claim 4, line 2, delete "2070%" and insert --20-70%--.

Signed and Sealed this

Third Day of July, 1990

*Attest:*

HARRY F. MANBECK, JR.

*Attesting Officer*  *Commissioner of Patents and Trademarks*